United States Patent
Sellers et al.

(10) Patent No.: US 10,152,708 B2
(45) Date of Patent: Dec. 11, 2018

(54) MULTI-DIMENSIONAL CODE TRANSLATION

(71) Applicant: Samsung Electronics Co., Ltd., Suwon-si, Gyeonggi-do (KR)

(72) Inventors: Christopher Sellers, Woodstock, IL (US); John Osborne, Incline Village, NV (US); David Russell, Winter Garden, FL (US)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 14/092,576

(22) Filed: Nov. 27, 2013

(65) Prior Publication Data
US 2014/0156376 A1 Jun. 5, 2014

Related U.S. Application Data

(60) Provisional application No. 61/732,222, filed on Nov. 30, 2012.

(51) Int. Cl.
G06Q 20/32 (2012.01)
G06Q 20/20 (2012.01)
G07G 1/00 (2006.01)

(52) U.S. Cl.
CPC ......... *G06Q 20/3276* (2013.01); *G06Q 20/20* (2013.01); *G06Q 20/3274* (2013.01); *G07G 1/0045* (2013.01)

(58) Field of Classification Search
CPC ............... G06Q 20/3276; G06Q 20/20; G06Q 20/3274; G07G 1/0045
USPC ........ 705/14.38, 14.14, 26.1, 23, 16, 39, 71, 705/14.25; 235/375, 462.12, 383
See application file for complete search history.

(56) References Cited

U.S. PATENT DOCUMENTS

| | | | | |
|---|---|---|---|---|
| 6,877,665 | B2 * | 4/2005 | Challa et al. ............ | 235/462.46 |
| 7,433,452 | B2 * | 10/2008 | Taylor .................... | G06Q 20/04 379/93.12 |
| 8,245,932 | B2 | 8/2012 | Gouelibo et al. | |
| 8,459,560 | B1 * | 6/2013 | Mineo-Goggin ........ | G02B 5/32 235/487 |

(Continued)

FOREIGN PATENT DOCUMENTS

| KR | 20120108501 A | 10/2012 |
|---|---|---|
| RU | 2008142687 A | 5/2010 |

(Continued)

OTHER PUBLICATIONS

International Search Report and Written Opinion, for International PCT Patent Application No. PCT/US13/072398, dated Mar. 5, 2014, pp. 1-6.
European Examination Report dated Oct. 18, 2017.

*Primary Examiner* — Vanel Frenel
(74) *Attorney, Agent, or Firm* — Jefferson IP Law, LLP

(57) ABSTRACT

Value documents such as coupons and event tickets that are represented or indexed in the form of QR codes or other types of two-dimensional encoding techniques may be acquired by imaging with a suitably-enabled mobile device, and then translated in the mobile device into a form suitable for presentation as a one-dimensional barcode at a point-of-sale/service using light-simulated barcode technology.

22 Claims, 6 Drawing Sheets

(56) References Cited

U.S. PATENT DOCUMENTS

| | | | |
|---|---|---|---|
| 8,751,316 B1* | 6/2014 | Fletchall | G07G 1/0081 705/16 |
| 8,825,532 B1* | 9/2014 | Wong | G06Q 20/3255 235/379 |
| 2005/0255599 A1* | 11/2005 | Wang | G01N 21/6428 436/56 |
| 2005/0258249 A1* | 11/2005 | Giebel et al. | 235/462.11 |
| 2007/0241189 A1* | 10/2007 | Slavin et al. | 235/383 |
| 2008/0011856 A1* | 1/2008 | Bremer et al. | 235/462.07 |
| 2009/0032584 A1 | 2/2009 | Yamada et al. | |
| 2009/0088202 A1* | 4/2009 | Toomer et al. | 455/556.1 |
| 2009/0234731 A1 | 9/2009 | Mariotti | |
| 2011/0191252 A1 | 8/2011 | Dai | |
| 2012/0029994 A1 | 2/2012 | Barkan et al. | |
| 2012/0061462 A1* | 3/2012 | Shadwell, Jr. | G06K 19/06206 235/375 |
| 2012/0095853 A1 | 4/2012 | von Bose et al. | |
| 2013/0144702 A1* | 6/2013 | Tabor et al. | 705/14.26 |
| 2013/0304559 A1* | 11/2013 | Stone et al. | 705/14.33 |
| 2013/0317923 A1* | 11/2013 | Capps | G06Q 30/06 705/16 |

FOREIGN PATENT DOCUMENTS

| | | |
|---|---|---|
| RU | 2439701 C2 | 1/2012 |
| RU | 2444060 C2 | 2/2012 |
| WO | 2007113448 A1 | 10/2007 |
| WO | 2008037094 A1 | 4/2008 |

* cited by examiner

MULTI-DIMENSIONAL CODE TRANSLATION

This application claims the benefit of U.S. Provisional Application No. 61/732,222, filed Nov. 30, 2012, the entire contents of which are hereby incorporated by reference.

BACKGROUND

Field

This invention relates to electronic commerce, and more particularly to electronic commerce with multi-dimensional codes such as QR codes.

Background

The quick response ("QR") code is one type of matrix (two-dimensional) barcode which offers fast readability and large storage capacity relative to standard UPC (one-dimensional) barcodes. The code is a square pattern of square black dots arranged on a white background. While the one-dimensional barcode was designed to be scanned by a beam of light, the QR code is detected as a digital image which is digitally analyzed for content. The code includes distinctive black squares at three of its corners, and a smaller black square in the fourth corner. These squares are analyzed to normalize the image for size, orientation, and angle of viewing. The square black dots in the code are then converted to binary information.

QR codes are commonly used to allow mobile devices to automatically read URLs or other data to reference products and services or to direct the mobile device's browser to a particular web site. QR codes are also used to explicitly or implicitly (via web site) provide value documents such as coupons or event tickets.

Despite their usefulness in consumer advertising and packaging because of the popularity of mobile devices, QR codes are less useful for transactions at point-of-sale/service ("POS") terminals because many POS terminals employ only one-dimensional bar code scanners which are incapable of reading QR codes.

BRIEF SUMMARY OF THE INVENTION

One embodiment of the present invention is a method for utilizing a multi-dimensional image code at a point-of-sale/service ("POS") terminal having a one-dimensional ("1-D") barcode scanner, comprising: imaging the multi-dimensional image code with a mobile device; extracting POS information from the multi-dimensional image code, in the mobile device; encoding the POS information into 1-D barcode-formatted POS information, in the mobile device; generating a signal from the barcode-formatted POS information to simulate a reflection of a 1-D barcode scanner scanning beam being moved across a static 1-D barcode image of the barcode-formatted POS information, in the mobile device; and transmitting light pulses from the mobile device in accordance with the signal.

Another embodiment of the present invention is a method for utilizing a multi-dimensional image code at a point-of-sale/service ("POS") terminal having a one-dimensional ("1-D") barcode scanner, comprising: imaging the multi-dimensional image code with a mobile device; identifying lead information from the multi-dimensional image code, in the mobile device; providing the lead information from the mobile device to a server over a network; receiving POS information on the mobile device from a server over a network, in accordance with the lead information; encoding the POS information into 1-D barcode-formatted POS information, in the mobile device; generating a signal from the barcode-formatted POS information to simulate a reflection of a 1-D barcode scanner scanning beam being moved across a static 1-D barcode image of the barcode-formatted POS information, in the mobile device; and transmitting light pulses from the mobile device in accordance with the signal. The lead information may be a URL of an originating organization, URLs related to the originating organization, product descriptions, telephone numbers, business names and addresses, intermediate references, any other information that would be useful as a lead for obtaining the URL of the originating organization or for obtaining POS information, and any combination of one or more of the foregoing.

DETAILED DESCRIPTION OF THE INVENTION

Figure 1:
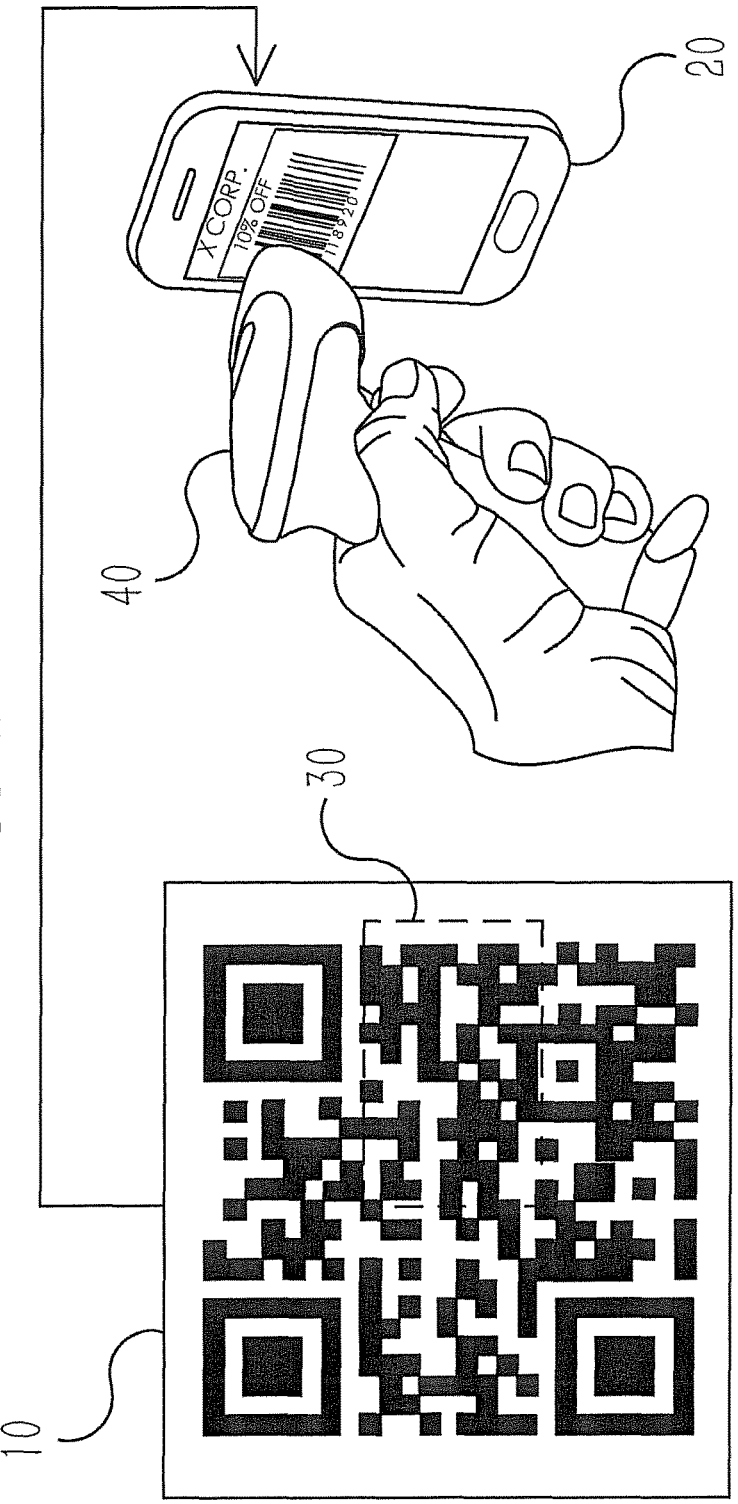
FIG. 1 is a schematic diagram which shows QR code translation when the QR code imaged by a mobile device contains embedded POS information to be presented as a light-simulated barcode to a 1-D barcode scanner.

Value documents such as coupons and event tickets that are represented or indexed in the form of QR codes or other types of two-dimensional encoding techniques may be easily acquired by imaging with a suitably-enabled mobile device, and then translated in the mobile device into a form suitable for presentation as a one-dimensional ("1-D") barcode at a point-of-sale/service ("POS") 1-D barcode scanner. Once imaged, the QR code may be analyzed by the mobile device to determine its information content. Since the QR code may contain data that is not needed for transmission as a 1-D barcode, the information content that is desired to be transmitted as a 1-D barcode may be identified and converted into a suitable 1-D barcode format for transmission as light pulses from the mobile device to the POS 1-D barcode scanner. Suitable light pulse generation and transmission technology, hereinafter referred to as light-simulated barcode technology, is disclosed in U.S. Pat. No. 6,685,093 issued Feb. 3, 2004 to Challa et al., U.S. Pat. No. 7,967,211 issued Jun. 28, 2011 to Challa et al., and in US Patent Application Publication No. 2010/0145789 published Jun. 10, 2010 in the name of Upadhya et al., all of which are incorporated herein in their entirety by reference thereto. This process of translating a QR code in a mobile device into a 1-D barcode format suitable for transmission as light pulses may proceed automatically and in the background, either in conjunction with acquisition of the QR code image, upon activation of the light-simulated barcode technology capability of the mobile device, or at any other time in any desired manner.

The information which is to be presented as a 1-D barcode at a POS with light-simulated barcode technology, which is referred to hereinafter as POS information, may be obtained using a QR code in various ways. The POS information is information that relates to an item of merchandise and that can be used to identify the item or to determine a purchase price for the item, including an alteration of the purchase price. Examples of POS information include inventory codes, universal product codes (UPC), price codes, coupon codes, promotional codes, discount codes and reward codes. One way to obtain the POS information, for example, is for the POS information itself to be embedded in the QR code matrix, either explicitly or implicitly via an information tagging methodology such as but not limited to XML. In this case, the mobile device needs only to parse the barcode information from the 2-D matrix and present it via light-simulated barcode technology to the POS 1-D barcode scanner to complete the transaction.

Another way, for example, is for the QR code to contain a URL or be linked to the URL of a particular Internet web page which may contain either explicit or implicit POS information which can be parsed by the mobile device and presented to the POS 1-D barcode scanner to complete the transaction. In this way, such a web page can contain more information than can be coded directly into the QR code and this information can be updated or altered by changing the web page without having to change the QR code itself.

As another example, an intermediary service may be accessed either by the user's browser or by an application loaded on the mobile device. This intermediary service accepts the QR code and then either looks up or creates POS information or even 1-D barcode formatted information based on the QR code. Moreover, this intermediary service could provide alternative, less expensive, clearance, or closer retailers, or direct Internet alternatives to the product or service being originally offered, essentially piggy-backing competitive content onto the QR code's original sales approach.

As another example, a simpler, easier to print and scan QR code with less data, such as a micro-QR code, may be used. Since the micro-QR code may not contain sufficient information to reference a URL, the micro-QR binary data may represent an intermediate reference code, which can be used by a known intermediary service to provide the URL, POS information, and/or competitive information. The result is that with the help of the intermediary service, the same information that could be referenced by a highly complex QR code can be obtained through a very simple and easy to reproduce micro-QR code. Utilization of the intermediary decoding service allows any amount of data to be retrieved via a micro-QR code.

As used herein, the term "value document" includes information signifying something of value in support of a transaction at a POS, including a coupon, event ticket, boarding pass, letter of credit, voucher, loyalty points, incentive reward, gift card, and so forth. The POS information can identify a value document or can function interchangeably as a value document.

As used here, the term "mobile device" includes digital electronic devices that are easily carried by the user and have an imaging capability, such as, for example, smartphones, mobile phones, personal digital assistants ("PDA"), gaming devices, audio and video players, fobs, USB Flash drives, tablets, laptops, ultrabooks, convertibles, and a variety of multimedia convergence products such as the IPHONE™ mobile digital device available from Apple Inc. of Cupertino, Calif., USA, and various competitive devices that run the Andriod operating system. Another example of such a mobile device is the NUMI™ key, which is available from MoBeam Inc. of Cupertino, Calif., USA. Personal electronic devices are suitable for many uses, including communications, entertainment, security, commerce, guidance, data storage and transfer, and so forth, and a particular device may be dedicated to a particular use or may be suitable for many different uses.

Many mobile devices have or can be equipped with light sources such as the device screen, infrared ports, and LEDs that may be driven by a simulated signal so that light from the light source simulates a reflection of a scanning beam being moved across a static visual image of the barcode. The technique for communicating information to a barcode scanner with light that simulates a reflection of a scanning beam being moved across a static visual image of the barcode may be referred to as "light-simulated barcode technology" and is described in, for example, U.S. Pat. No. 6,685,093 issued Feb. 3, 2004 to Challa et al., U.S. Pat. No. 6,877,665 issued Apr. 12, 2005 to Challa et al., U.S. Pat. No. 7,028,906 issued Apr. 18, 2006 to Challa et al., U.S. Pat. No. 7,395,961 issued Jul. 8, 2008 to Challa et al., U.S. Pat. No. 7,857,225 issued Dec. 28, 2010 to Challa et al., and U.S. Pat. No. 7,967,211 issued Jun. 28, 2011 to Challa et al., all of which hereby are incorporated herein in their entirety by reference thereto. The term "light" is a broad term which includes infrared light as well as visible light. Personal electronic devices enabled with the light-simulated barcode technology are attractive to operators of facilities equipped with standard barcode scanners, since they provide an additional and efficient way for transaction facility users to carry out transactions without requiring the transaction facility operators to replace, supplement or even modify their barcode scanners.

Advantageously, mobile devices may be designed with processors (including microprocessors, controllers, and so forth) and memory, and the operating system, data and computer programs may be stored on the mobile device in the memory. The mobile device may include, for example, static or dynamic RAM ("SRAM" or "DRAM," respectively) memory, FLASH memory, or any other type of memory. The various methods described herein may be implemented on the mobile devices in applications known as "apps" or other types of software, which may be stored in the memory of the mobile device. Such applications may be written in any suitable programming language and installed on the mobile device via a downloaded from an application store, or preloaded on the mobile device, or loaded from a development or distribution computer over a direct wired or wireless connection to the mobile device, or in any other desired manner.

First Illustrative Apparatus and Method

FIG. 1 shows a mobile device 20 with an imaging (2-D or 3-D) capability, illustratively an optical digital camera. Generally, the mobile device 20 may use any suitable imaging technology, including 2-D scanning, an array of sensors, and so forth. The imaging capability is used to capture a multi-dimensional code, such as but not limited to a QR code, 3-DI, Array Tag, Aztec Code, Small Aztec Code, Codablock, Code 1, Code16K, Code49, ColorCode, Color Construct Code, Compact Matrix Code, CP Code, Cyber- Code, d-touch, DataGlyphs, Data matrix, Datastrip Code, Dot Code A, EZcode, Grid Matrix code, HD Barcode, High Capacity Color Barcode, HueCode, Intacta.code, InterCode, JAGTAG, MaxiCode, mCode, MiniCode, MicroPDF417, MMCC, Nintendo e-Reader#Dot code, Optar, PaperDisk, PDF417, PDMark, QuickMark Code, Secure Seal, SmartCode, Snowflake Code, ShotCode, SPARQCODE, SuperCode, Trillcode, UltraCode, UnisCode, VeriCode, VSCode, WaterCode, and so forth. The following description is for QR code 10, although it will be appreciated that the principles described herein are applicable to other types of multi-dimensional codes.

POS information, which is the information to be presented as a 1-D barcode at a POS with light-simulated barcode technology, may reside in a particular area 30 within the data of the QR code. The POS information may be encoded by either explicit or implicit means. For implicit encoding, both the encoding and decoding systems are aware of the position and format of the POS information. For explicit encoding, identification of the position and format of the data is contained within the encoding itself, such as, for example, XML data tagging. The POS information is identified and converted into 1-D barcode-formatted POS information, which in turn is used to generate a signal to control transmission of light pulses from the mobile device to a POS 1-D barcode scanner 40. For the mobile device 20 as shown, the light pulses are generated by modulating the backlight or the pixels of the screen, although generally, any light source on a mobile device may be used for providing the light pulses. The 1-D barcode shown on the screen is displayed for the benefit of the user, and is not necessarily detectable by the scanner 40.

Figure 2:
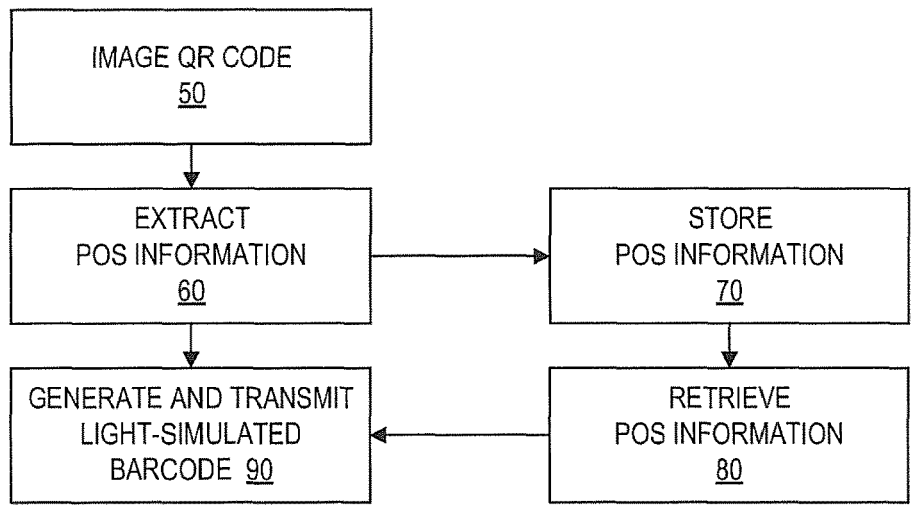
FIG. 2 is a flowchart for QR code translation as shown in FIG. 1.

FIG. 2 is a flowchart of a method for processing, with a mobile device, POS information embedded in a QR code for transmission as a light-simulated barcode. An image of the QR code is acquired in any desired manner (block 50). The image includes POS information represented by square dots in the area 30, and this POS information is extracted from the other 2-D encoded data (block 60). The POS information may be saved on the mobile device (block 70) for later retrieval (block 80). In either case, the POS information is used to generate a light-simulated barcode (block 90) for presentation to a POS 1-D barcode scanner 40.

The method shown in FIG. 2 barcode data such as coupons, travel boarding passes, and event tickets to be encoded in a 2-D encoding for simplicity and ease of scanning, as well as for providing a plethora of ancillary data along with essential data to the mobile device, even while enabling the essential data to be provided as 1-D barcode data for redemption at POS terminals and event scanners. As an example, a coupon may be represented by the number sequence 0 1 2 3 4 5 6 7 8 9. This number sequence may be encoded in area 30 of a QR code, while the other areas of the QR code may contain other information such as the product description, the savings represented by the coupon, and so forth. This number sequence is extracted from the QR code (block 60) and used to transmit a light-simulated barcode (block 90), illustratively by generating a barcode formatted signal from the POS information, and then using the barcode formatted signal to generate the light pulses. The light pulse may then be interpreted by a POS terminal as a coupon code. The coupon code may then be used to adjust the price of an item being purchased.

Second Illustrative Apparatus and Method

Figure 4:
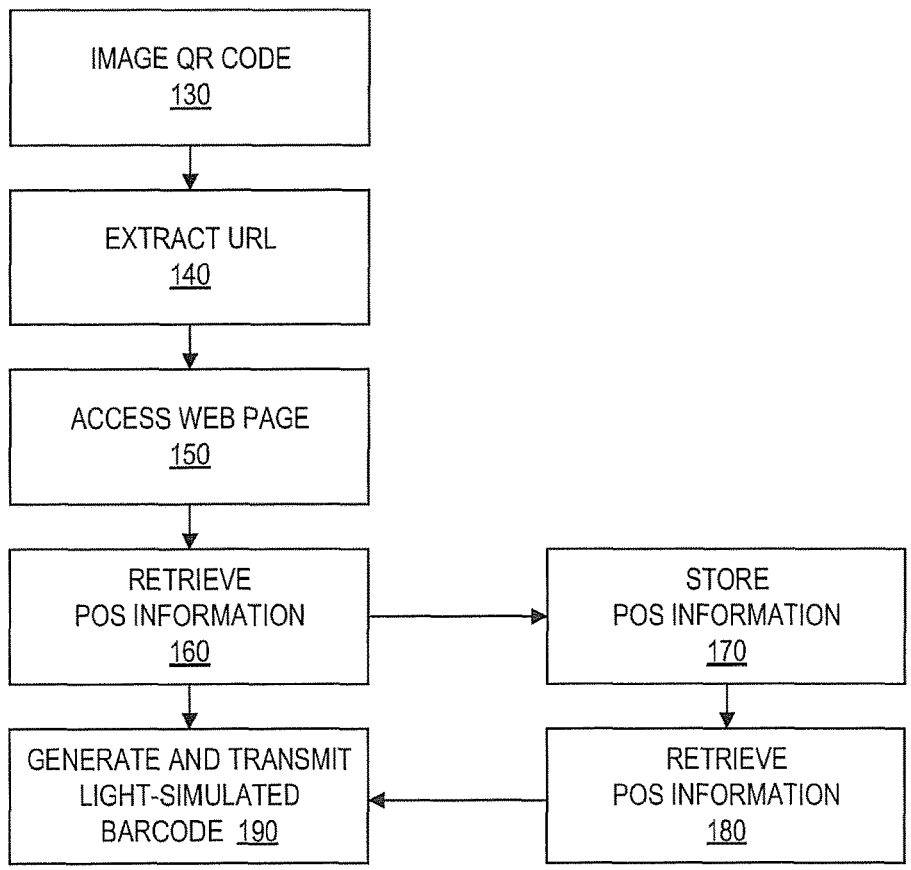
FIG. 4 is a flowchart for QR code translation as shown in FIG. 3.
Figure 3:
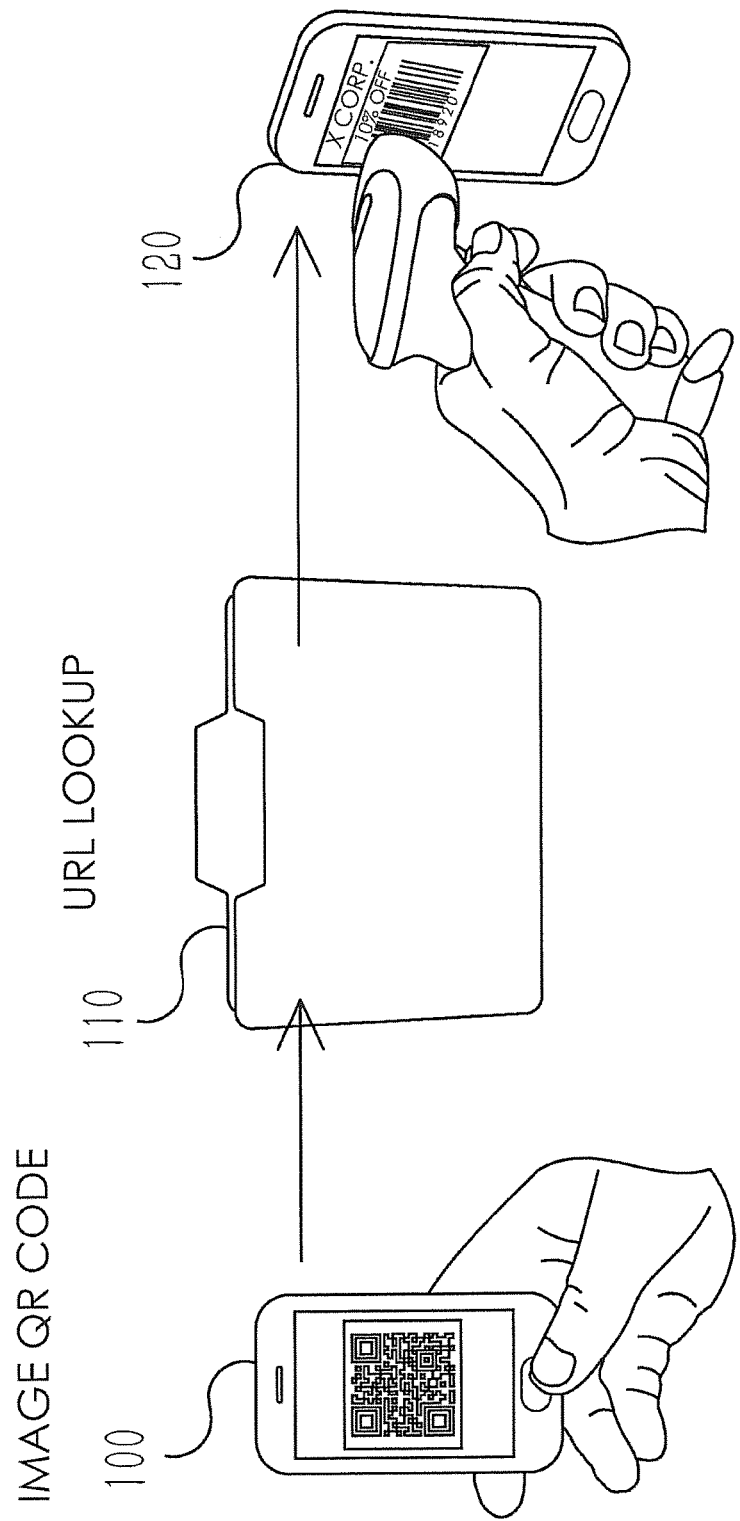
FIG. 3 is a schematic diagram which shows QR code translation when the QR code imaged by a mobile device contains an embedded URL for locating information to be presented as a light-simulated barcode to a 1-D barcode scanner.

In another illustrative implementation shown in FIG. 3 and FIG. 4, the POS information is not embedded within the QR code itself, but is available via a web page to which the QR code points. Operating under a suitable application, for example, a mobile device 100 images the QR code (block 130), and the application extracts a Uniform Resource Locator ("URL") (block 140). The application may then access a web page (block 150) to request POS information from the lookup server 110 (block 160), in which the POS information may be implicitly or explicitly embedded. The POS information may be saved on the mobile device (block 170) for later retrieval (block 180) for generating a light-simulated barcode (block 190), or used immediately for generating a light-simulated barcode (block 190).

Third Illustrative Apparatus and Method

Figure 5:
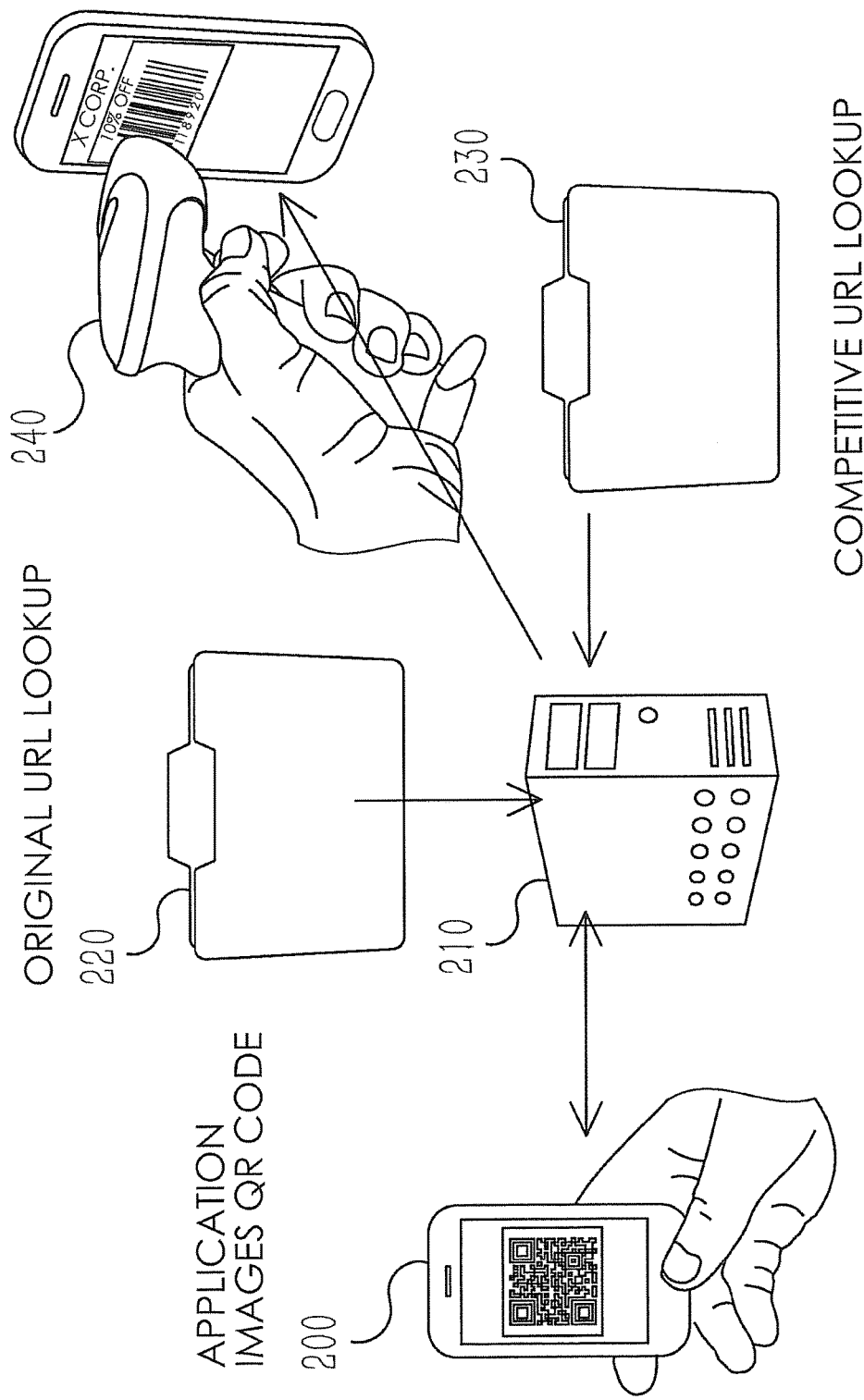
FIG. 5 is a schematic diagram which shows QR code translation when the QR code imaged by a mobile device contains an embedded URL for locating an intermediary service for QR code translation.
Figure 6:
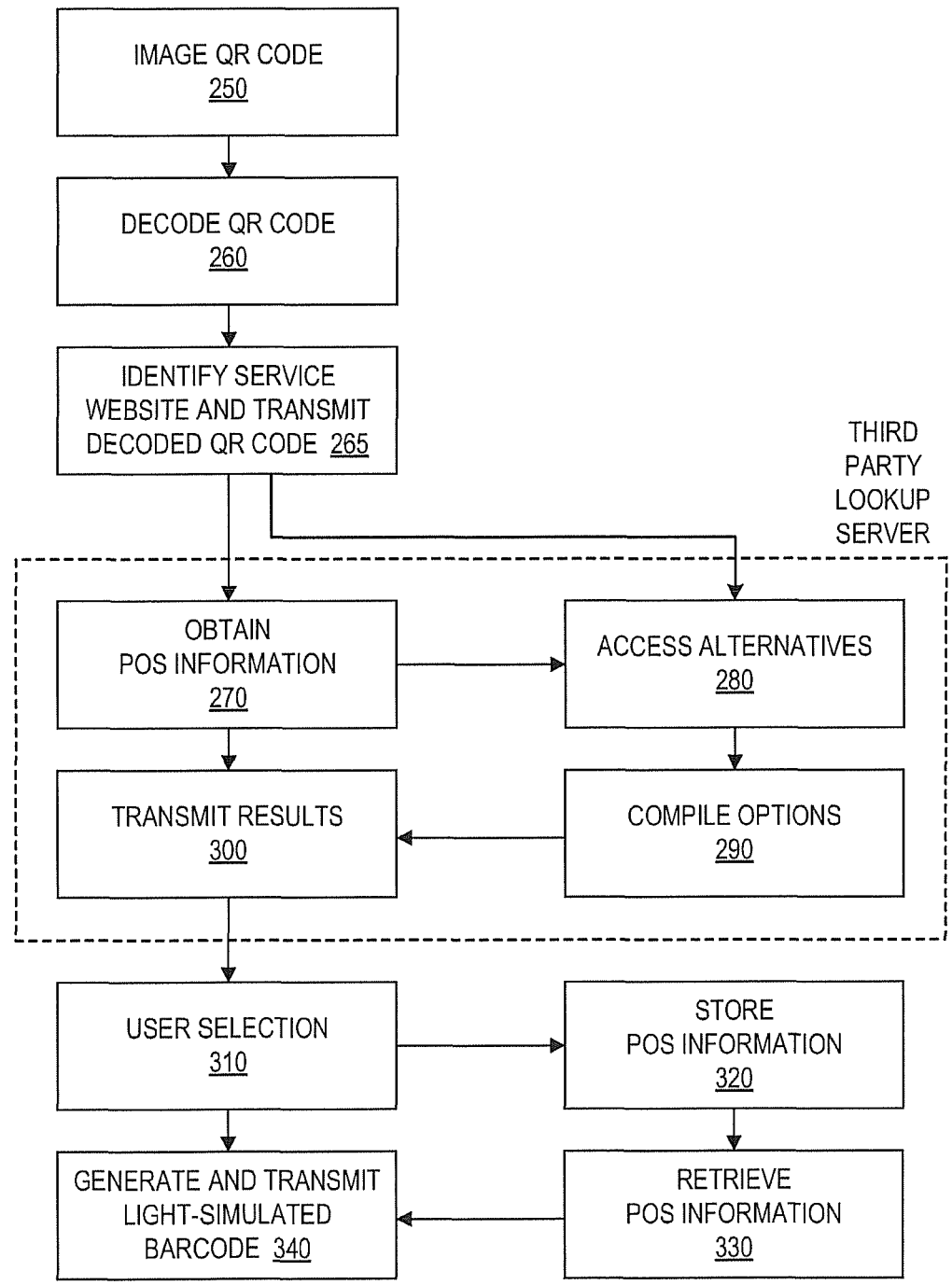
FIG. 6 is a flowchart for QR code translation as shown in FIG. 5.

In another illustrative implementation shown in FIG. 5 and FIG. 6, an intermediary service may be utilized to provide the translation and other services to the customer. A mobile device 200 images a QR code (block 250). An application on the mobile device 200 decodes the QR code (block 260) and identifies a third party lookup server website and transmits all or part of the decoded QR code to the identified website (block 265), which is set up to handle the translation task. The URL's for suitable intermediary server websites may be implicitly encoded in the application, or provided via other means such as but not limited to another external service, data files stored on the mobile device, or a search lookup via another service such as Google, or entered by the user.

Once the intermediary server 210 receives the decoded QR code, it may use any part of the decoded QR code as lead information for ultimately obtaining POS information as well as any other information useful to the mobile device, and providing the POS and other information to the mobile device. The decoded QR code may, for example, contain URL's related to the originating organization, product descriptions, telephone numbers, business names and addresses, intermediate references, and any other information that would be useful as a lead for obtaining the URL of the originating organization or for obtaining POS information. In one example, the intermediary server may have a direct lookup table which contains certain types of QR code data and relates this data to certain POS information, and may obtain the POS information from this table (block 270) and may transmit the results to the mobile device (block 300). In a second example, the decoded QR code may include URL's or other information related to the organization which created the QR code, and may use that information to identify and access the server 220 of the organization which created the QR code and obtain POS information (block 270) and/or other data from that website. In a third example, the intermediary service may use any of the data from the decoded QR code or obtained from the lookup table or from the originating organization's website to search for other websites 230 (block 280) which may have sales offers, similar merchandise, or be geographically closer to the customer than the origin product or service. These alternatives may be compiled (block 290) and then transmitted to the mobile device 200 (block 300) for storage and/or display by the application. In some instances, the origin data may or may not be transmitted as part of the displayed options, effectively hijacking the original QR code in favor of competing goods, services, or offers.

Once the options are received by the mobile device 200, they may be displayed for the user to make a selection (block 310). The final POS information, the options, or other data may be used to generate and transmit a light-simulated barcode (block 340), or stored for later retrieval (block 320).

The stored data may be later retrieved (block 340) and used to generate and transmit a light-simulated barcode (block 340).

Fourth Illustrative Apparatus and Method

Figure 7:
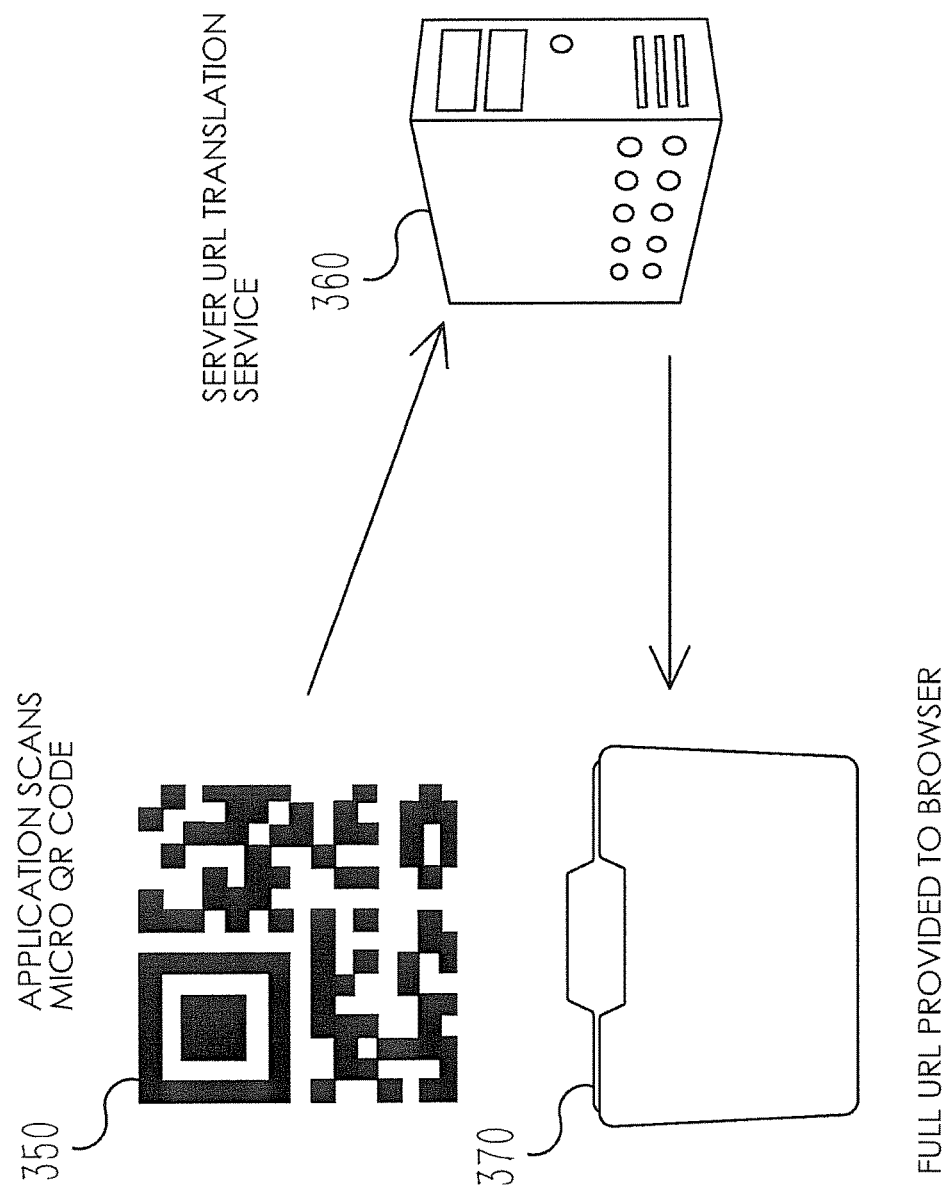
FIG. 7 is a schematic diagram which shows QR code translation when the micro QR code imaged by a mobile device contains a short code for locating an intermediary service for QR code translation.

In another illustrative implementation shown in FIG. 7, some 2-D codes such as the Micro QR code are able to contain only a very little data, and may be insufficient to embed POS information or even to hold a full URL. In this instance, a short code may be embedded in the matrix 350, and the code can be transmitted to an intermediary service 360 in a manner similar to the third implementation, where full URLs or other data may be stored and linked to the short code. The intermediary service may provide either the full URL 370 or other data to the mobile device's browser or provide optional goods and services recommendations in a manner similar to the third implementation.

The various embodiments of the invention described herein are illustrative. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention, as set forth in the following claims.

The invention claimed is:

1. A method for converting a multi-dimensional image code for a point-of-sale/service ("POS") terminal having a one-dimensional ("1-D") barcode scanner, comprising:
   acquiring the multi-dimensional image code with a mobile device;
   extracting, at the mobile device, POS information from the multi-dimensional image code, the POS information referencing a product or service;
   encoding, at the mobile device, the extracted POS information into 1-D barcode-formatted POS information corresponding to a static 1-D barcode image;
   generating, at the mobile device, a signal from the barcode-formatted POS information to simulate a reflection of a 1-D barcode scanner scanning beam being moved across the static 1-D barcode image; and
   transmitting, from the mobile device to the 1-D barcode scanner, light pulses in accordance with the signal.

2. The method of claim 1 wherein:
   the POS information is received at the POS terminal; and
   the POS terminal completes a POS transaction based on the received POS information.

3. The method of claim 2 wherein the POS transaction comprises purchasing an item of merchandise.

4. The method of claim 3 wherein the POS information identifies a coupon for adjusting a purchase price of the item of merchandise.

5. The method of claim 3 wherein the POS information identifies a price for the item of merchandise.

6. The method of claim 1 wherein the POS information identifies a value document or functions as a value document.

7. The method of claim 6 wherein the value document comprises a coupon, an event ticket, a boarding pass, a letter of credit, a voucher, loyalty points, an incentive reward, or a gift card.

8. The method of claim 1, wherein the POS information resides in a particular position within the data of the multi-dimensional image code.

9. The method of claim 8, wherein the particular position is identified by tagging.

10. A method for converting a multi-dimensional image code for a point-of-sale/service ("POS") terminal having a one-dimensional ("1-D") barcode scanner, comprising:
    acquiring the multi-dimensional image code with a mobile device;
    translating, at the mobile device, the multi-dimensional image code to POS information, the POS information referencing a product or service;
    encoding, at the mobile device, the POS information into 1-D barcode-formatted POS information corresponding to a static 1-D barcode image;
    generating, at the mobile device, light pulses from the barcode-formatted POS information to simulate a reflection of a 1-D barcode scanner scanning beam being moved across the static 1-D barcode image; and
    presenting, from the mobile device to the 1-D barcode scanner, the light pulses.

11. The method of claim 10 wherein said translating comprises:
    identifying lead information from the multi-dimensional image code;
    providing the lead information from the mobile device to a server over a network; and
    receiving POS information at the mobile device from the server over the network, in accordance with the lead information.

12. The method of claim 11 wherein the lead information is a uniform resource locator (URL) of an originating organization, URL's related to the originating organization, product descriptions, telephone numbers, business names and addresses, intermediate references, any other information that would be useful as a lead for obtaining the URL of the originating organization or for obtaining POS information, and any combination of one or more of the foregoing.

13. The method of claim 10 wherein said translating comprises extracting POS information from the multi-dimensional image code.

14. The method of claim 10 wherein said generating light pulses comprises:
    generating a signal from the barcode-formatted POS information to simulate the reflection of the 1-D barcode scanner scanning beam being moved across the static 1-D barcode image of the 1-D barcode-formatted POS information.

15. The method of claim 10 wherein:
    the POS information is received at the POS terminal in response to presenting the light pulses; and
    the POS terminal completes a POS transaction based on the POS information.

16. The method of claim 15 wherein the POS transaction comprises purchasing an item of merchandise.

17. The method of claim 16 wherein the POS information identifies a coupon for adjusting a purchase price of the item of merchandise.

18. The method of claim 16 wherein the POS information identifies a price for the item of merchandise.

19. The method of claim 10 wherein the POS information identifies a value document or functions as a value document.

20. The method of claim 19 wherein the value document comprises a coupon, an event ticket, a boarding pass, a letter of credit, a voucher, loyalty points, an incentive reward, or a gift card.

21. Non-transitory computer-readable media having stored thereon a software program, which when executed, causes one or more computing devices to perform a method comprising:

acquiring an image of a multi-dimensional image code, the POS information referencing a product or service;

translating the multi-dimensional image code to POS information;

encoding the POS information into 1-D barcode-formatted POS information corresponding to a static 1-D barcode image;

generating light pulses from the barcode-formatted POS information to simulate a reflection of a 1-D barcode scanner scanning beam being moved across the static 1-D barcode image; and presenting the light pulses to a 1-D barcode scanner.

22. Non-transitory computer-readable media having stored thereon a software program, which when executed, causes one or more computing devices to perform a method comprising:

acquiring the multi-dimensional image code with a mobile device;

extracting, at the mobile device, POS information from the multi-dimensional image code, the POS information referencing a product or service;

encoding, at the mobile device, the extracted POS information into 1-D barcode-formatted POS information corresponding to a static 1-D barcode image;

generating, at the mobile device, a signal from the barcode-formatted POS information to simulate a reflection of a 1-D barcode scanner scanning beam being moved across the static 1-D barcode image; and transmitting, from the mobile device to a 1-D barcode scanner, light pulses in accordance with the signal.

* * * * *